United States Patent [19]

Losic et al.

[11] Patent Number: 5,282,129
[45] Date of Patent: Jan. 25, 1994

[54] CONTROL BASIC BUILDING BLOCK (CBBB)

[76] Inventors: Novica A. Losic, 253 Westvale Drive, Waterloo, Ontario, N2T 2C7, Canada; Ljubomir D. Varga, Deskaseva 6, 11000 Beograd, Yugoslavia

[21] Appl. No.: 696,133

[22] Filed: May 6, 1991

Related U.S. Application Data

[63] Continuation-in-part of Ser. No. 663,551, Mar. 4, 1991, abandoned.

[51] Int. Cl.$^5$ .............................................. G05B 13/02
[52] U.S. Cl. .................................... 364/152; 318/561; 318/632; 364/157; 364/176; 364/183
[58] Field of Search ...................... 364/148, 149–151, 364/152–156, 157, 158–166, 176, 177, 183; 318/561, 632, 615–618, 611

[56] References Cited

U.S. PATENT DOCUMENTS

| | | | |
|---|---|---|---|
| 4,679,136 | 7/1987 | Shigemasa | 364/157 |
| 4,758,943 | 7/1988 | Astrom et al. | 364/157 |
| 4,951,191 | 8/1990 | Hiroi et al. | 364/157 X |
| 5,043,863 | 8/1991 | Bristol et al. | 364/157 X |

Primary Examiner—Joseph Ruggiero

[57] ABSTRACT

A method of synthesizing a control system which provides for ideal properties of zero error in both transient and steady state with respect to both input command and external disturbance in an inherently adaptive/self-tuning manner as no parameters of the object under the control are needed to be known wherein the control system utilizes a Control Basic Building Block (CBBB) consisting of an inner positive voltage feedback loop within an outer negative voltage feedback loop incorporating prescribed stabilization circuits for maintaining system stability.

14 Claims, 6 Drawing Sheets

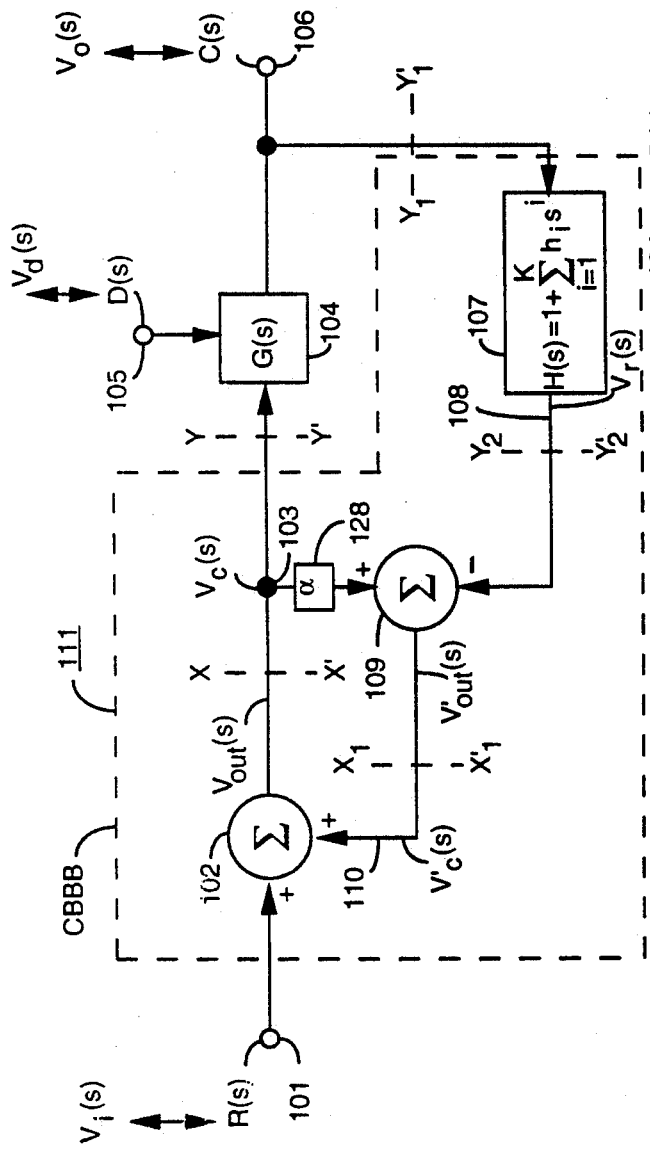
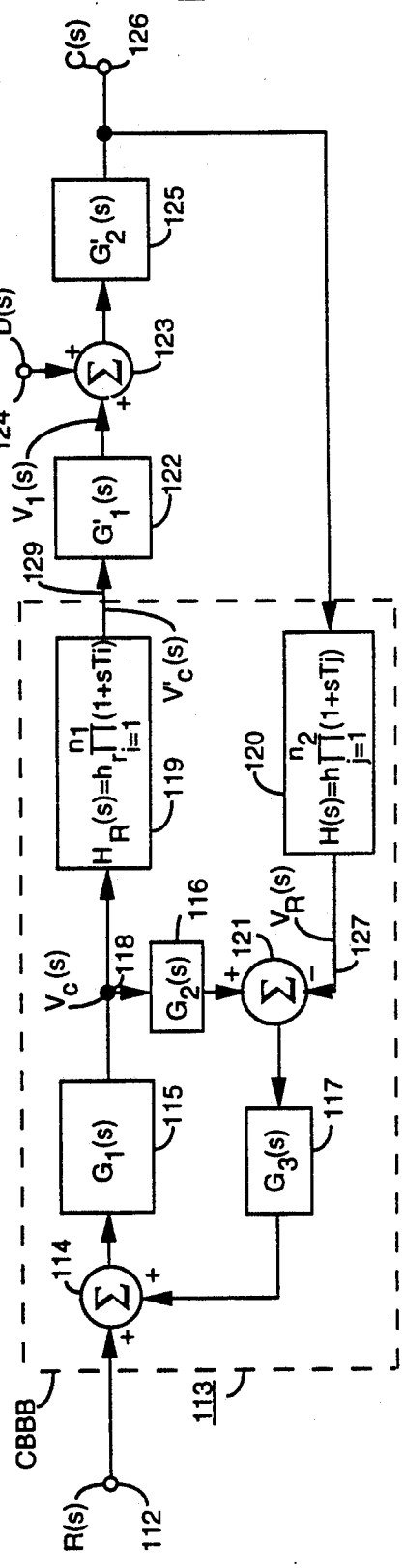
FIG. 1a
FIG. 1b

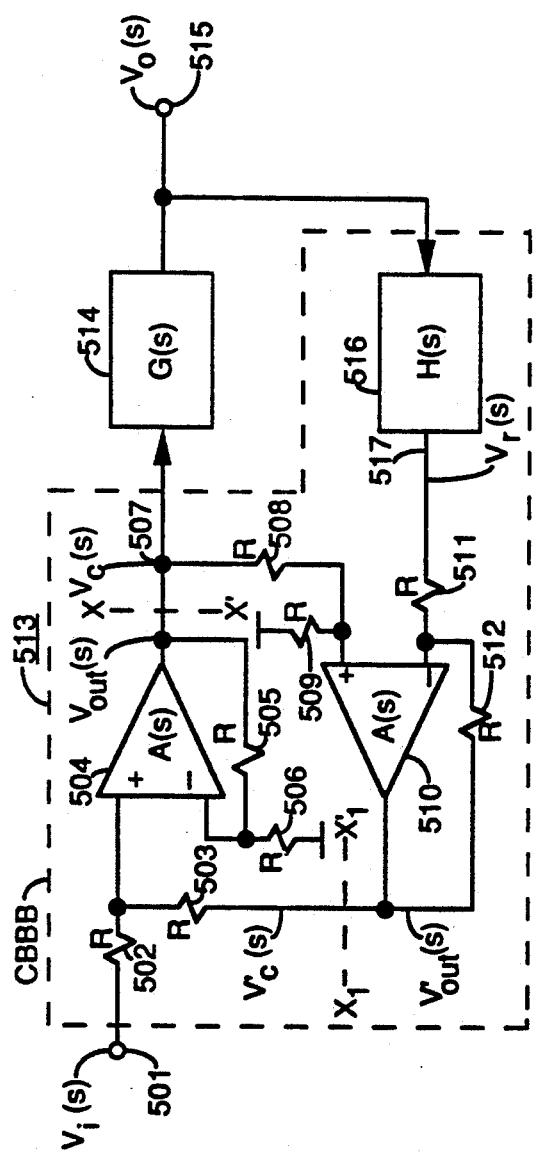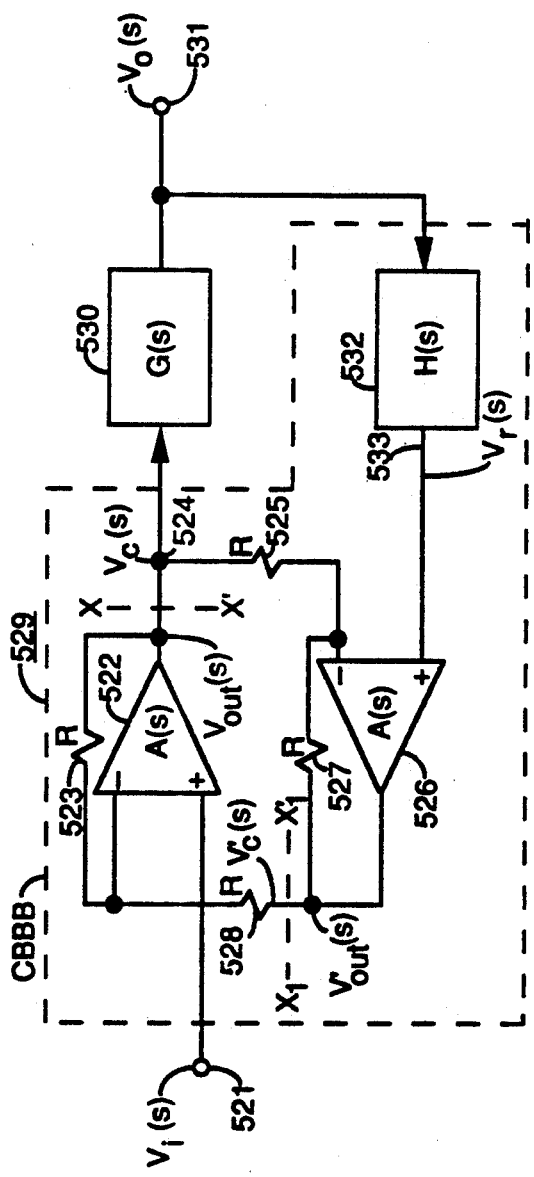

CONTROL BASIC BUILDING BLOCK (CBBB)

This is a continuation-in-part of Ser. No. 07/663,551, filed Mar. 4, 1991 now abandoned.

FIELD OF THE INVENTION

This invention relates to control systems and more particularly to a method using an inherently adaptive/self-tuning control algorithm in a form of an entity/block to achieve an ideal control featuring zero error in both transient and steady state with respect to both an input command and external disturbance.

BACKGROUND OF THE INVENTION

In control system theory and practice it is of interest to provide as good control as possible in terms of providing as small error as possible with respect to both input command and external disturbance. As ultimate control should result in a zero error in both transient and steady state. Furthermore, the control algorithm should ultimately provide for an adaptive/self-tuning control system operation because the parameters of the system under the control may in general change, as it often happens in practice. Clearly, none of the presently known control techniques and/or algorithm provide for such an ultimate control and in such an ultimate manner except the synthesis methods described in the U.S. patents of these two same inventors which provide some of the ideal properties described above for some classes of the systems under the control. The referred U.S. patents are U.S. Pat. No. 4,885,674 of December 1989 ("Synthesis of Load-Independent Switch-Mode Power Converters"), U.S. Pat. No. 4,967,134 of October 1990 ("Synthesis of Load-Independent AC Drive Systems"), U.S. Pat. No. 4,973,174 of November 1990 ("Parameter-Free Synthesis of Zero-Impedance Converter"), U.S. Pat. No. 4,980,620 of December 1990 ("Current-Free Synthesis of Parameter-Free Zero-Impedance Converter"), U.S. Pat. No. 4,990,001 of February 1991 ("Synthesis of Drive Systems of Infinite Disturbance Rejection Ratio and Zero-Dynamics/Instantaneous Response"), U.S. Pat. No. 5,001,770 of March 1991 ("Synthesis of Improved Zero-Impedance Converter"), U.S. Pat. No. 5,013,998 of May 1991 ("Synthesis of Zero-Impedance Converter"), U.S. Pat. No. 5,020,125 of May 1991 ("Synthesis of Load-Impedance DC Drive System"), U.S. Pat. No. 5,019,958 of May 1991 ("Generalized Synthesis of Control Systems of Zero-Order/Instantaneous Response and Infinite Disturbance Rejection Ratio"), and U.S. Pat. No. 5,034,872 of July 1991 ("Current-Free Synthesis of Improved Parameter-Free Zero-Impedance Converter"). While the U.S. Pat. No. 5,019,958 above describes a generalized synthesis method based on a state-space approach, U.S. Pat. Nos. 4,885,674, 4,967,134, 4,973,174, 4,990,001, 5,001,770, 5,013,998, and 5,020,125 describe synthesis methods based on algorithms incorporating both current feedback loop and voltage feedback loops, and U.S. Pat. Nos. 4,980,620 and 5,034,872 describe synthesis methods based on algorithms using three voltage feedback loops.

SUMMARY OF THE INVENTION

It is therefore an object of the present invention to provide a synthesis method for synthesizing a control basic Building Block (CBBB) based on a minimum number of control loops: two voltage feedback loops. The resulting entity can then be considered a basic building block, hence the name, similarly as an op amp is a basic building block in electronics. The CBBB provides for an ideal control, seen in zero error in both transient and steady state with respect to both input command and external disturbance, and is inherently an adaptive/self-tuning control algorithm implying no need for the knowledge of the parameters of the system under the control. The CBBB can be applied in any control system application including control of switch mode power converters, electric motor drive systems (including also other types of motors), control of physical processes, robot control, etc.

Briefly, for use with a control system, the preferred embodiment of the present invention includes an inner positive voltage feedback loop of unity loop gain within an outer negative voltage feedback loop incorporating stabilization circuits of respective transfer functions $H(s)$ and $HR(s)$. Denoting the Laplace transformers of input command $R(s)$, output response $C(s)$, external disturbance $D(s)$, the system under the control (plant) $G(s)$, it will be shown in the detailed description of the present invention that ideal control system properties are achieved, as given in Equations (1) and (2), while the control is simultaneously perfectly stable $$C(s)/R(s) = 1/H(s) \quad (1)$$

$$C(s)/D(s) = 0 \quad (2)$$

Additionally, the preferred embodiment of the present invention operates without a knowledge of the parameters of the plant, $G(s)$, implying the adaptive/self-tuning property of the algorithm.

The ability to provide for an ideal control, limited only by physical limitations of any physical system, and further in an adaptive/self-tuning manner and in an ultimately simplest, inexpensive and feasible way, is a material advantage of the present invention. The circuit realization of the CBBB reduces to implementing arithmetic (summing) and stabilizing blocks.

These and other objects and advantages of the present invention will no doubt be obvious to those skilled in the art after having read the following detailed descriptions of the preferred embodiment illustrated in the figures of the drawing.

BRIEF DESCRIPTION OF THE DRAWING

FIGS. 1a and 1b are block diagrams of a presently preferred embodiment of the invention;

FIGS. 5a and 5b are circuit diagrams of a possible realization of the presently preferred embodiment of the invention;

DETAILED DESCRIPTION

Figure 2A:
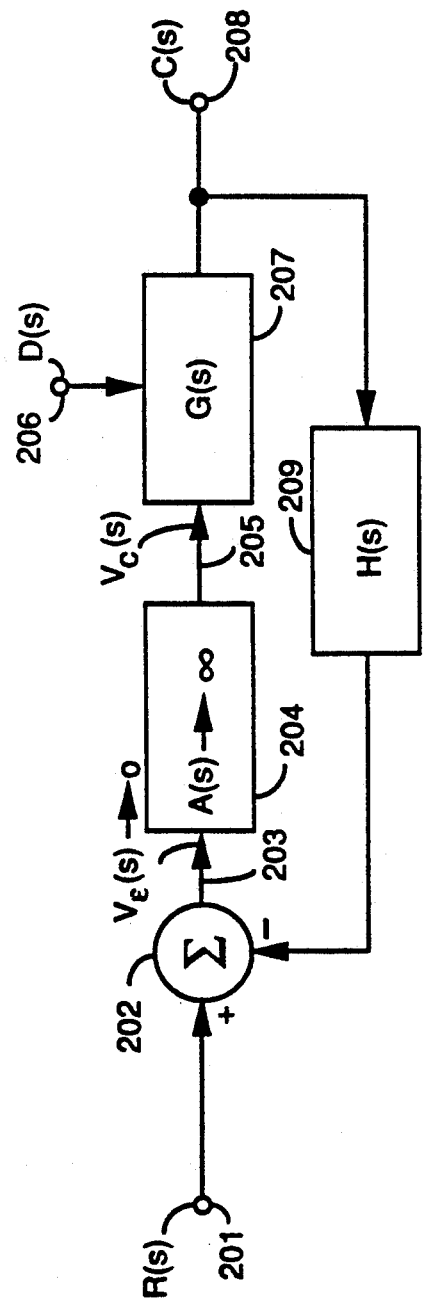
FIGS. 2a and 2b are block diagrams of a system equivalent to the system illustrated in FIG. 1a for $\alpha=1$.
Figure 2B:
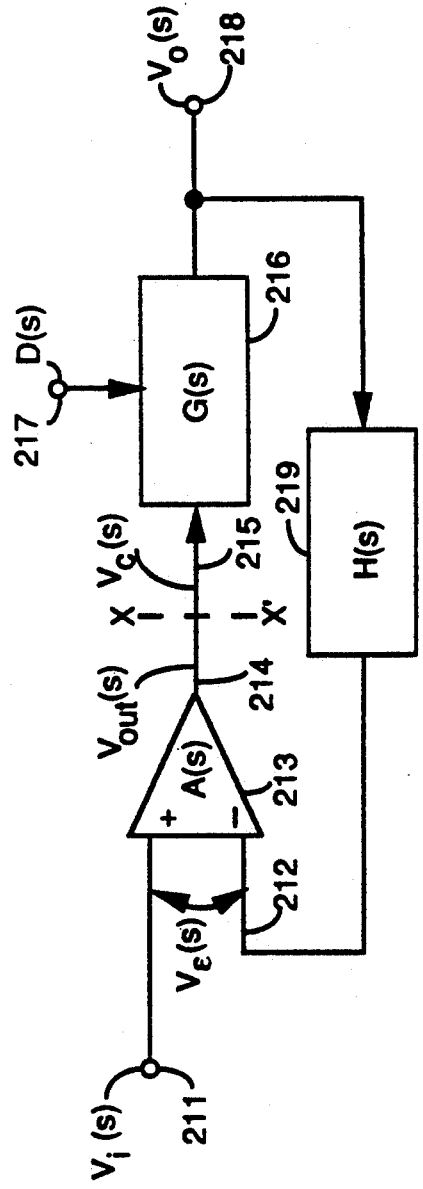

Prior to describing in detail the preferred embodiment of the present invention, illustrated in FIG. 1, we shall describe a block diagram of FIG. 2 depicting a case of a system equivalent to the one in FIG. 1a for $\alpha=1$. FIG. 2a shows a block diagram of such a case while FIG. 2b illustrates the same case using an operational amplifier (op amp) to implement a block of very high gain A(s). In FIG. 2a, R(s) denotes (Laplace transformed) control input signal (command) applied to an input terminal 201. The algebraic summer 202 performs subtraction of the feedback signal H(s)C(s) from the command signal R(s) producing an error signal $V_e(s)$ at the summer's output 203 due to the negative feedback established through the feedback circuit H(s) numbered 209. The error signal $V_e(s)$ is in turn applied to an amplifier block 204 whose gain is A(s) so that a control signal $V_c(s) = A(s)V_e(s)$ is produced at the amplifier's output 205 and applied to the system under the control 207 whose transfer function is G(s). In a general case, the controlled system is also subject to a (external) disturbance D(s) applied to the system from point 206. The output variable which is under the control is denoted C(s) and exists at point 208. A negative feedback of the output signal C(s) is implemented through the feedback circuit H(s). It is well known, and appealing from inspecting the system in FIG. 2a, that in this classical case an ideal control is achieved by having the block 204 of infinite gain, $A(s) \to \infty$, in which case the error would approach zero, $V_e(s) \to 0$, both in response to command R(s) and disturbance D(s). The ideal control system properties, given in Eqs.(1) and (2) in the summary of the invention and repeated here, are then achieved.

$$C(s)/R(s) = 1/H(s) \qquad (1)$$

$$C(s)/D(s) = 0 \qquad (2)$$

The ideal properties in Eqs.(1) and (2) are achieved independently of the parameters of the system under the control (plant) G(s), implying an inherent adaptive/self-tuning operation as an additional benefit.

It is known as well that, unfortunately, the control scheme of FIG. 2a cannot work in practice because of too high loop gain which, when higher than 1 at the frequencies at which the additional phase shift contributed by the G(s)A(s)H(s) results in total of $\pm 360° = 0°$, would cause instability ruling out the use of the unstable system.

The loop gain from FIG. 2a is $$LG(s) = A(s)G(s)H(s)$$

which approaches infinity for $A(\alpha) \to \infty$, resulting in the unstable system. A practical realization of the system of FIG. 2a is shown in FIG. 2b wherein as op amp of open loop transfer function (gain)

$$A(s) = A_o/(1 + s\tau) \qquad (3)$$

is used to realize the block of very high gain. In FIG. 2b, similarly as in FIG. 2a, $V_i(s)$ represents an input command applied at point 211, A(s) is the (open-loop) gain of the of amp 213, $V_c(s)$ is a control signal applied to the plant 216 of transfer function G(s), H(s) denotes transfer function of the feedback circuit 219, D(s) is disturbance applied to the plant 216 from point 217, and $V_o(s)$ is the controlled variable at the output 218. The negative feedback loop is closed through H(s) and lead 212 so that an error signal $V_e(s)$ is seen between the input command $V_i(s)$ and the feedback signal existing on lead 212. It is clear again that for the op amp gain $A(s) \to \infty$ (achieved for $A_o \to \infty$ as seen from Eq.(3)) the error signal $V_e(s) \to 0$ implying an ideal control as described previously in connection with FIG. 2a. However, as expected, this realization suffers from instability as shown next. To determine the loop gain in FIG. 2b, we break the loop at any convenient point, such as X-X' break, and find the ratio of receiving signal $V_{out}(s)$, existing on lea 214, and sending signal $V_c(s)$, existing at leas 215. In doing so, assume that the impedance seen by the $V_c(s)$ is high enough so that terminating the loop with that same high impedance would practically leave the receiving voltage $V_{out}(s)$ unchanged. (The high impedance can always be ensured by appropriate buffering).

The loop gain is defined as $$LG(s) = -V_{out}(s)/V_c(s) \qquad (4)$$

From FIG. 2b, $$V_{out}(s) = V_c(s)G(s)H(s)[-A(s)] \qquad (5)$$

From Eqs.(4) and (5), and for $A(s) \to \infty$ $$LG(s) \to \infty$$

implying instability, as expected.

Therefore, the theoretically ideal control system shown in FIG. 2 is in general case unstable and thus useless.

FIG. 1 gives a presently preferred embodiment of the invention which provides for both ideal control system properties, given in Eqs.(1) and (2), and system stability. The preferred embodiment of FIG. 1 also does all this in an inherently adaptive/self-tuning manner, i.e., without need for knowing the parameters of the plant G(s). Since the preferred embodiment of the present invention reduces to an entity/block and since its purpose is a control function, it is called a Control Basic Building Block (CBBB), similarly as an op amp is treated a basic building block in electronics. The CBBB, as seen from FIG. 1a and FIG. 1b, consists of algebraic/summing and stabilizing blocks synthesized in such a way as to provide, as it will be shown in here, for the simultaneous existence of ideal control system properties, such as given previously in Eqs.(1) and (2), and stability. This subject is, as surely felt by the reader, the essence of this invention and a subject of the remaining description of the preferred embodiment of the present invention. A description of FIG. 1a follows.

An input command signal R(s), applied at point 101, constitutes one of the two inputs of the CBBB. Also processed within CBBB is a negative voltage feedback signal $V_f(s)$, fed back by means of a load 108. The output of the CBBB is a control voltage signal $V_c(s)$, available at point 103. The Control Basic Building Block (CBBB), 111, consists of algebraic summers 109 and 102, a gain block 128, and stabilizing block 107 which enable closing of a unity gain positive voltage feedback loop (for $\alpha = 1$) and of a negative voltage feedback loop closed through a stabilizing feedback circuit 107 of transfer function H(s). Of course, the two algebraic summers 109 and 102 can equivalently be represented by a single algebraic summer which would still provide for the closing of the two loops. A transfer function of a controlled system is G(s) and the controlled system is numbered 104. A disturbance D(s) may in general enter the system from an external point 105. An output controlled variable C(s) exists at point 106 and is fed via the feedback circuit 107 to close the negative voltage feedback loop within the CBBB. The Laplace transformed generalized variables R(s), C(s), and D(s) may be considered representatives of voltage variables $V_r(s)$, $V_o(s)$, and $V_d(s)$, respectively.

From FIG. 1a, and for the gain of gain block 128 $\alpha = 1$, $$V_c(s) = R(s) - H(s)C(s) + V_c(s) \quad (6)$$

From Eq.(6) it is seen that the ideal control system property, shown earlier in Eq.(1) and repeated here, holds $$C(s)/R(s) = 1/H(s) \quad (1)$$

To examine more closely the effects of the disturbance D(s), let G(s) be partitioned in two subsystems $G_1'(s)$ and $G_2'(s)$ connected in series (cascade) and apply the disturbance D(s) to an algebraic summer inserted in between the subsystem $G_1'(s)$ and $G_2'(s)$. (This is relatively easy visualization and thus has not been illustrated in this detail in FIG. 1a). From such a picture it is easily seen that $$C(s)/D(s) = G_2'(s)/\{1 + H(s)[V_c(s)/V_r(s)]G_1'(s)G_2'(s)\}$$

but, the transfer function $V_c(s)/V_r(s)$ results in an infinite gain, i.e., for $\alpha \to 1$, $[V_c(s)/V_r(s)] \to \infty$, yielding the second ideal control system property, shown earlier in Eq.(2) and repeated here $$C(s)/D(s) = 0 \quad (2)$$

In addition to providing for the ideal control system properties, given in Eqs.(1) and (2), it is seen that they are provided independently from the parameters of the system under the control G(s), implying an inherent adaptive/self-tuning operation.

The synthesis of the embodiment in FIG. 1a requires appropriate expression for loop gain (to be shown in Eq.(8)) in general case of m-th order of controlled system/plant 104, and a synthesis of the stabilizing feedback circuit 107 of transfer function H(s) must be provided in order to make the embodiment useful. Before giving the latter synthesis method, however, it is of interest to show that the loop gain of the system of FIG. 1a is equally found by breaking the loop either outside of the algebraic summers and the associated loop via lead 110 or inside them. Breaks made anywhere outside, such as Y-Y', $Y_1$-$Y_1'$ and $Y_2$-$Y_2'$, result in the loop gain $$LG(s) = [V_c(s)/V_r(s)]G(s)H(s) \to \infty$$

because transfer function $[V_c(s)/V_r(s)] \to \infty$ for $\alpha = 1$.

Alternatively, as suggested above, for the breaks made inside, such as X-X' and $X_1$-$X_1'$, a functionally equivalent value of the loop gain is obtained as it will be shown next. It is assumed that the same (high) impedance seen from the sending signal ($V_c(s)$ for break X-X', or $V_c'(s)$ for break $X_1$-$X_1'$) is used to terminate the receiving end of the break (where signals $V_{out}(s)$ or $V_{out}'(s)$ exist, respectively) as usual. Thus, from FIG. 1a, and for break X-X', and for $\alpha = 1$, $$V_{out}(s) = V_c(s)[1 - G(s)H(s)] \quad (7)$$

From Eqs.(4) and (7)

$$LG(s) = G(s)H(s) = 1 \quad (8)$$

Similarly, from FIG. 1a, and for break $X_1$-$X_1'$, and for $\alpha = 1$, $$V_{out}'(s) = V_c'(s)[1 - G(s)H(s)]$$

which is functionally identical to Eq.(7) resulting in the same value of the loop gain as given in Eq.(8).

The point is that, although it may not be obvious from direct comparison, the value of the loop gain found through inside breaks, such as X-X' and $X_1$-$X_1'$, and given in Eq.(8) is identical to the value found through outside breaks, Y-Y' or $Y_1$-$Y_1'$ or $Y_2$-$Y_2'$, and expressed above as $$LG(s) = [V_c(s)/V_r(s)]G(s)H(s) \to \infty, \text{ for } \alpha = 1 \quad (9)$$

The identity of the two expressions for the loop gain will be discussed in a moment; prior to that discussion, however, it should be said that, for the purpose of understanding and synthesizing the embodiment of FIG. 1a (and in FIG. 1b), the alternative (unobvious) value of the loop gain in Eq.(8) is needed because it enables such an understanding and synthesis. For example, trying to plot the Nyquist diagram using Eq.(9) calls for plotting infinite magnitudes of the loop gain as the angle of the loop gain increase (phase shift due to the LG(s) accumulates with increasing the frequency). This, clearly, is not as feasible as plotting the polar diagram of G(s)H(s) from Eq.(8) versus frequency. From such a polar diagram (magnitude of $G(j\omega)H(j\omega)$ versus phase of $G(j\omega)H(j\omega)$ as the radial frequency $\omega$ increases from zero to infinity) it is readily seen that the condition for stability for the embodiment of FIG. 1a is, for all frequencies, GH(s) > 0. (Such a diagram is not shown in the drawings but is easily visualized). Specifically, the polar plot of $G(j\omega)H(j\omega)$ should never cross the negative real axis, i.e., it should go at least infinitesimally to the right from the origin to cross the positive real axis for 180° phase contribution from $G(j\omega)H(j\omega)$ in order to maintain the stability of the embodiment in FIG. 1a. This is because the polar plot of $G(j\omega)H(j\omega)$ from FIG. 1a and the Nyquist plot (of the loop gain) of the embodiment of FIG. 1a are shifted for 1 with respect to each other: the information available from the expression for the loop gain in Eq.(8) and not as directly available from the expression for the loop gain in Eq.(9).

As promised in the beginning of this paragraph, the identity of the two expressions for the loop gain of the embodiment of FIG. 1a, as given in Eqs.(8) and (9), it further discussed now. The two values for the loop gain are identical because they produce the same effects to the closed loop transfer function of the embodiment in question. Namely from FIG. 1a and using the value of the loop gain in Eq.(8)

$$C(s)/R(s) = G(s)/\{1 + LG(s)\} = G(s)/\{1 + G(s)H(s) - 1\} = 1/H(s)$$

the value originally given in Eq.(1).

Alternatively, from FIG. 1a and using the value of the loop gain in Eq.(9)

$$C(s)/R(s)=\{[V_c(s)/V_r(s)]G(s)\}/\{1+LG(s)\}=\{[V_c(s)/V_r(s)]G(s)\}/\{1+[V_c(s)/V_r(s)]G(s)H(s)\}$$

which for $\alpha + 1$ results in the same equation and value of the closed loop transfer function as, again, originally given in Eq.(1), i.e., $$C(s)/R(s)=1/H(s)$$

Figure 3A:
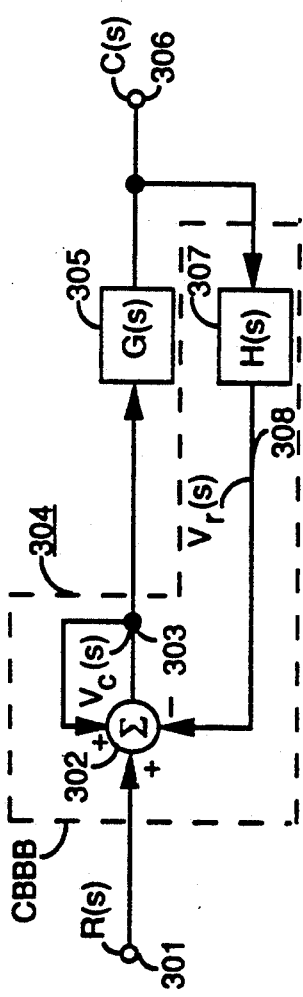
FIGS. 3a, 3b and 3c are block diagrams of an equivalent of the presently preferred embodiment of the invention.

An alternative approach to finding the loop gain of the embodiment of FIG. 1a is illustrated in FIG. 3. Essentially, the system in FIG. 3a is identical to the system in FIG. 1a (for $\alpha = 1$). The Control Basic Building Block (CBBB), numbered 304, consists of a circuit 307 and an algebraic summer 203 which enables closing the unity gain positive voltage feedback loop and the negative voltage feedback loop, via lead 308. An input command signal R(s) is applied to terminal 301 as an input to CBBB, and a control voltage signal $V_c(s)$ is provided at point 303 as an output from the CBBB. The control voltage signal $V_c(s)$ controls the plant 305 of transfer function G(s). The controlled output variable C(s) is provided at terminal 306. The negative feedback is closed through a feedback circuit 307 of transfer function H(s) which at its output, 308, provides a negative voltage feedback signal $V_r(s)$ which is used to closed the feedback inside the CBBB.

Figure 3B:
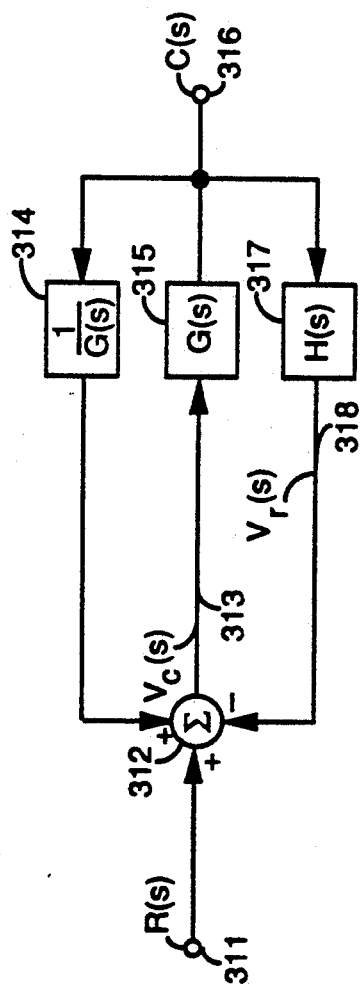

FIG. 3b is equivalent to FIG. 3a and thus equivalent to FIG. 1a. In FIG. 3b, the positive feedback loop of unity loop gain is closed through a block 314 of gain 1/G(s), and the negative feedback loop is closed through the feedback circuit 317 of gain H(s). An algebraic summer provides at its output 313 a control voltage signal $V_c(s)$ for an input command signal R(s) applied at point 311 and a negative voltage feedback signal $V_r(s)$ applied via lead 318. An output controlled variable C(s) is available at point 316. The algebraic summer is referred to with numeral 312 and the plant is referred to with numeral 315. The transfer function of the plant is G(s).

Figure 3C:
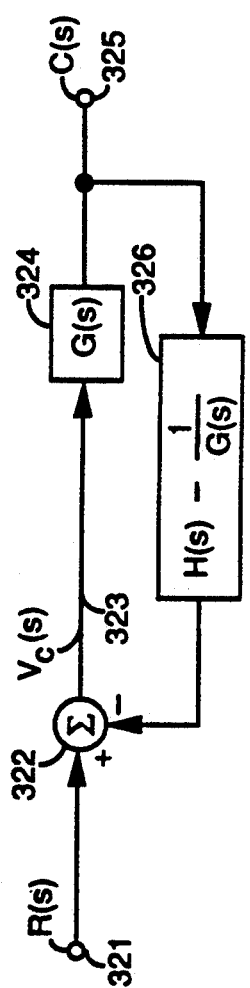

FIG. 3c is equivalent to FIG. 3b and thus equivalent to FIG. 1a. FIG. 3c, a block 326 of transfer function H(s)−1/G(s) represents simultaneous acting of blocks 314, in positive feedback loop, and 317, in negative feedback loop, of FIG. 3b. An input command signal R(s), applied to point 321, is fed to the algebraic summer 322 which is used to close the resulting feedback loop and to produce a control voltage signal $V_c(s)$ on lead 323 controlling plant 324. The plant transfer function is G(s) and an output controlled variable C(s) is available at point 325.

From FIG. 3c $$LG(s)=G(s)H(s)-1$$

which is the same result as obtained in Eq.(8) for the preferred embodiment in FIG. 1a as expected. As seen from the last expression above, shown earlier as Eq.(8), the internal workings of the CBBB, which have to be accounted for in order to find a value of the loop gain of the preferred embodiment of FIG. 1a are based on the simultaneous action of both loops involved (one positive, another negative), i.e., on the mutual effects that these two loops have on each other. In that sense, as stated before, alternative approach in finding the loop gain of the embodiment of FIG. 1a by breaking the loop outside of the CBBB's internal mechanisms does not recognize/see the mechanisms involved in the CBBB working and consequently offers less insight.

Figure 4A:
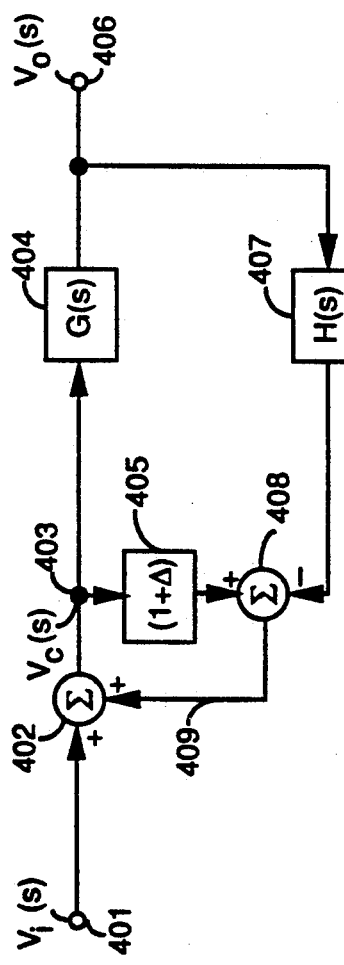
FIGS. 4a, 4b and 4c are block diagrams used in supporting analysis of the presently preferred embodiment of the invention.
Figure 4B:
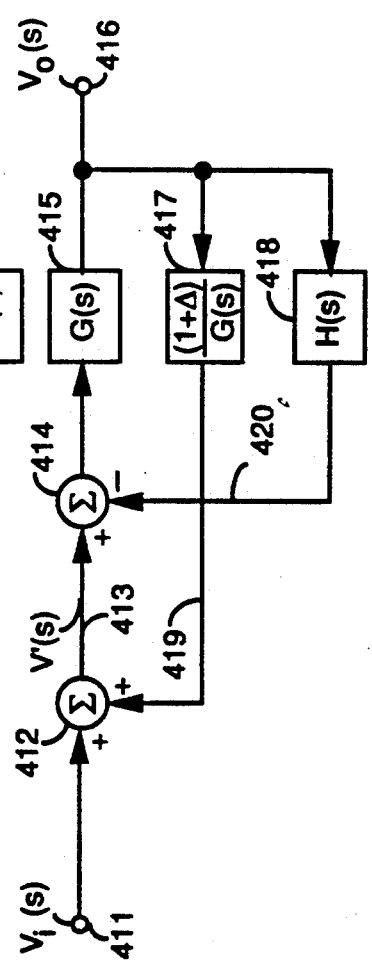
Figure 4C:
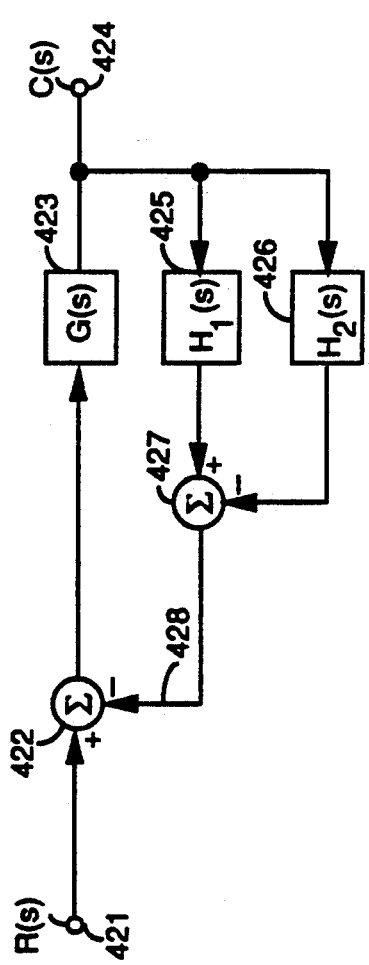

Another supporting analysis is illustrated in FIG. 4. Systems in FIGS. 4a and 4b are equivalent to the embodiment in FIG. 1a for $\Delta = 0$ ($\alpha = 1$). System in FIG. 4c is equivalent to the embodiment in FIG. 1a for $H_1(s)=H(s)$, and $H_2(s)=1/G(s)$. The supporting analysis is to do with a stability condition. Namely, due to the definition of the loop gain in Eq.(4), the loop gain of the unity feedback gain positive feedback loop is −1. Now, the combined loop gain of the negative feedback loop and the unity gain positive feedback loop is as given earlier in Eq.(8) and repeated here $$LG(s)=G(s)H(s)-1 \qquad (8)$$

This combined loop gain should enable the contribution of the negative feedback loop to prevail over the contribution of the positive feedback loop of the unity loop gain so that there should be, for stability, $$G(s)H(s)-1>-1$$

yielding the stability condition established earlier in connection with Nyquist criteria $$G(s)H(s)>0 \qquad (10)$$

The systems illustrated in FIG. 4 support this condition for stability as shown next, after a description of FIGS. 4a, b, and c. In FIG. 4a an input voltage command signal $V_i(s)$ is applied to terminal 401. A positive feedback loop is closed through a block 405 of transfer function $(1+\Delta)$, algebraic summer 408, and algebraic summer 402. A negative feedback loop is closed through a feedback circuit 407 of transfer function H(s), algebraic summer 408, and algebraic summer 402. At the output 403 of algebraic summer 402 there exists a control voltage signal $V_c(s)$ applied to the plant 404 of transfer function G(s). An output controlled variable, in a form of voltage $V_o(s)$, is produced at terminal 406. The common effect of the two loops is conveyed via lead 409. A block diagram in FIG. 4b is equivalent to the one in FIG. 4a. In FIG. 4b, the input command $V_i(s)$, applied at terminal 411, is fed to a summer 412 where it is added to a positive feedback signal available on lead 419 to produce a voltage signal V'(s) on lead 413. The signal V'(s) on lead 413 is fed to an algebraic summer 414 where it is opposed in a negative feedback manner by a signal available on lead 240. The signals on leads 419 and 420 are produced by passing an output controlled variable, $V_o(s)$, available at terminal 416, through the respective circuits 417, of transfer function $(1+\Delta)/G(s)$, and 418, of transfer function H(s). The plant is numbered 415 and characterized by transfer function G(s). In FIG. 4c, an input command signal R(s) is applied at terminal 421. An algebraic summer 422 enables subtraction of a signal available on lead 428 from R(s). A signal obtained as a result of the subtraction is applied to a plant 423 of transfer function G(s) whose output is a controlled variable C(s), available at terminal 424. The output controlled variable is passed through a feedback circuit 425 of transfer function $H_1(s)$ and another parallel feedback circuit 426 of transfer function $H_2(s)$. The outputs of the circuits 425 and 426 are algebraically summed in an algebraic summer 427 to produce the signal available on lead 428. It is seen from FIG. 4c that the algebraic summing performed in the summers 422 and 427 is such as to establish a negative voltage feedback loop through $H_1(s)$ and a positive voltage feedback loop through $H_2(s)$.

The stability criterion for the systems in FIG. 4a, b an in FIG. 4c is derived next. It is seen that FIG. 4b is equivalent to FIG. 4a. The stability analysis will be performed for FIG. 4b implying its validity for both FIG. 4a and FIG. 4b. Let loop gain of the positive feedback loop accounting for the effects of the negative feedback loop in FIG. 4b be denoted $LG_{pos}(s)$. From FIG. 4b, $$LG_{pos}(s) = [(1+\Delta)/G(s)][V_o(s)/V'(s)]$$

where $V_o(s)/V'(s) = G(s)/[1+G(s)H(s)]$ yielding $$LG_{pos}(s) = (1+\Delta)/[1+G(s)H(s)] \quad (11)$$

For stability, $LG_{pos}(s)$ should be less than one. This applied to Eq.(11) gives $$G(s)H(s) > \Delta \quad (12)$$

The stability condition of inequality (12), for $\Delta = 0$ becomes identical to the previously derived condition given in inequality (10), as predicted.

Generalizing, consider the system in FIG. 4c consisting of a negative feedback loop closed through $H_1(s)$ and a positive feedback loop closed through $H_2(s)$. The loop gain for the system in FIG. 4c is $$LG(s) = G(s)[H_1(s) - H_2(s)]$$

For negative feedback prevailing, $[H_1(s) - H_2(s)] > 0$, the condition for stability reduces to classical gain and/or phase margin criterion for the loop gain and, ultimately, these should always be observed. For positive feedback prevailing, $[H_2(s) - H_1(s)] > 0$, the condition for stability is that the total loop gain should still be less than one, i.e., $[G(s)H_2(s) - G(s)H_1(s)] < 1$ from which $$G(s)H_1(s) > G(s)H_2(s) - 1$$

It is seen from the last expression above that for a positive feedback loop of unity loop gain, $G(s)H_2(s) = 1$, the condition of stability is identical to the one given earlier (Eq.(10)) as expected. The meaning of the last expression above is in that position feedback should always be "attenuated" by the negative feedback so that the total (positive) feedback is always kept under less-than-one loop gain.

In the light that Eq.(11) represents the loop gain of the positive feedback loop accounting for the effects due to the negative feedback loop, it can be stated that Eq.(8) represents the loop gain of the negative feedback loop accounting for the effects due to the positive feedback loop, i.e., $LG(s) = LG_{neg}(s)$. As shown here, a common condition for stability of the system incorporating CBBB, as that of FIG. 1a, resulting from either of the above two expressions for the loop gain, $LG_{neg}(s)$ or $LG_{pos}(s)$, is that $G(s)H(s) > 0$.

It should be noted at this point that the stability condition above further implies a necessity for possible additional stabilization of the negative feedback loop itself, i.e. the loop closed through block of $H(s)$, to ensure that the negative feedback loop always stays negative (stable). Depending on the nature of the controlled system $G(s)$ it may be necessary to include a stabilization block in series with $G(s)$, keeping $H(s)$ in the negative feedback loop. The analysis of this kind will be given later in the description of the preferred embodiment of the present invention in connection with FIG. 1b.

Further, since the ideal transfer function of Eq.(1) is achieve through the use of the CBBB, it may be desired to bring it to a zero order which is simply done by connecting a block of transfer function $mH(s)$ in series with the system input (between R(s) and the CBBB in FIG. 1a) resulting in $C(s)/R(s) = m$. Also, a nominal engineering care should be taken with respect to non-linearity/saturation problems but this subject is of no relevance with respect to the description of the functioning of the CBBB and is a rather separate issue.

Returning to the description of the embodiment of FIG. 1a, and as said earlier with reference to the need for synthesis of the stabilizing feedback circuit 107 of transfer function $H(s)$ in general case of m-th order of controlled system/plant 104, such a synthesis is shown as follows.

From FIG. 1a, and in the light of the manner in which the loop gain in Eq.(8) was earlier obtained and subsequently confirmed using the equivalency in FIG. 3, the loop gain is $$LG(s) = G(s)H(s) - \alpha \quad (13)$$

Therefore, the closed loop transfer function for the embodiment in FIG. 1a is $$C(s)/R(s) = G(s)/\{1 + LG(s)\} = G(s)/\{1 - \alpha + G(s)H(s)\} \quad (14)$$

Let $$G(s) = K_s[P_n(s)/Q_m(s)],$$

where the plant respective polynomials are $$P_n(s) = 1 + \sum_{i=1}^{n} a_i s^i,$$

n = Order of numerator polynomial of transfer function of plant, $$Q_m(s) = 1 + \sum_{j=1}^{m} b_j s^j,$$

m = Order of denominator polynomial of transfer function of plant, $n \leq m$, so that the closed loop gain in Eq.(14) becomes $$C(s)/R(s) = [K_s P_n(s)]/[Q_m(s)(1-\alpha) + K_s P_n(s)H(s)] \quad (15)$$

Let stabilizing feedback circuit be characterized with only a constant gain $$H(s) = h$$

i.e., use only a proportional feedback control. It is seen from Eq.(15) that the conditions for stability is that gain $\alpha < 1$ so that in the limit case $(1 - \alpha)$ approaches zero from the positive side, i.e., $$(1-\alpha) \to 0^+ \quad (16)$$

as, in such a case, a Routh-Hurwitz criterion of stability has a possibility to yield stable system. It is also seen that the plant denominator polynomial $Q_m(s)$ in such a case affects the stability at higher frequencies. Due to the existence of component drifts in physical systems, the variation of $a$ physically exists and, therefore, it should be minimized and controlled to satisfy Eq.(16) for stability to be maintained. It is also interesting to notice that the term $Q_m(s)(1-a)$ has much smaller coefficients as compared to the values of the coefficients in the plant numerator polynomial $P_n(s)$, i.e., the coefficients of the higher degree terms ($s^m$, $s^{m-1}$, ..., $s^{n+1}$) are much smaller than the coefficients of the lower degree terms ($s^n$, $s^{n-1}$, ..., $s^0$); the, so called, Bessel polynomial characterizes the denominator of the closed loop transfer function in Eq.(15).

Both the component value drift (variation of $a$) and the effects of the plant denominator polynomial at higher frequencies to the stability of the embodiment are maximally minimized by synthesizing the stability feedback circuit (numbered 107 in FIG. 1a) as a differentiating circuit such that the degree of the polynomial $P_n(s)H(s)$ in denominator of Eq.(15) becomes equal to the degree of the plant denominator polynomial $Q_m(s)$. Thus, taking a stable polynomial to characterize the stabilizing feedback circuit $$H(s) = \prod_{i=1}^{k} (1 + sT_i) = 1 + \sum_{i=1}^{k} h_i s^i,$$

$k = m-n =$ Order of stabilizing feedback circuit,
$h_i =$ Constant,
i.e., using the derivative control for the stabilizing feedback circuit, the closed loop transfer function of Eq.(15) becomes $$C(s)/R(s) = \left(1 + \sum_{i=1}^{n} a_i s^i\right) / \left\{[(1-a)/K_s]\left[1 + \sum_{j=1}^{m} b_j s^j\right] + \left[1 + \sum_{i=1}^{n} a_i s^i\right]\left[1 + \sum_{i=1}^{m-n} h_i s^i\right]\right\}$$  (17)

It is seen from Eq.(17) that lettering $K_s$ large value the effects due to the plant denominator polynomial (characterized with coefficients $b_j$) are minimized as well as that the stability is maintained for $a <> 1$, i.e., $$(1-a) \to \pm 0$$  (18)

yields stable system.

A generalization of the embodiment of FIG. 1a yields another preferred embodiment of the present invention, shown in FIG. 1b. Before showing the synthesis of the embodiment of FIG. 1b, the description of the block diagram in FIG. 1b is in order. In FIG. 1b, an input command signal $R(s)$ is applied at point 112 as an input to the CBBB 113. Also processed within CBBB is a negative voltage feedback signal $V_f(s)$, fed back via lead 127. The output of the CBBB is a control voltage signal $V_c'(s)$, available on lead 129. The CBBB consists of algebraic summers 121 and 114, gain blocks 115, 116, and 117, and stabilizing blocks 120 and 119. The gain blocks are characterized by the transfer functions $G_1(s)$, $G_2(s)$, and $G_3(s)$, respectively, and the stabilizing blocks are characterized by the transfer functions $H(s)$ (stabilizing feedback circuit) and $H_R(s)$ (stabilizing direct path circuit), respectively. A unity gain positive voltage feedback loop is closed for $G_1(s)G_2(s)G_2(s)=1$. As in FIG. 1a discussion, the two algebraic summers, 121 and 114 in FIG. 1b, could equivalently be represented by a single algebraic summer still providing for the closing of the two loops. A partitioning of the controlled system into blocks 122 and 125 of transfer functions $G_1'(s)$ and $G_2'(s)$, respectively, is done to explicitly show a generalized entry of disturbance $D(s)$ from an external point 124 in between the blocks 122 and 125 via algebraic summer 123. An output controlled variable $C(s)$ is obtained at point 126 and is fed via the stabilizing feedback circuit 120 to close the negative voltage feedback loop within the CBBB. A control signal $V_c(s)$ is produced internally in the CBBB at point 118. $G(s) = G_1'(s)G_2'(s)$.

From FIG. 1b it is easily shown that the loop gain of the embodiment is $$LG(s) = G_1(s)G_3(s)H(s) - G_1(s)G_2(s)G_3(s)$$  (19)

Eq.(19) reduces to Eq.(8), derived originally for the embodiment of FIG. 1a, for $G_1(s) = G_2(s) = G_3(s) - 1$, as expected. Thus, the embodiment in FIG. 1a is a particular form of the embodiment in FIG. 1b which is a generalized embodiment, as claimed above. The characteristic equation of the embodiment of FIG. 1b is $$1 + LG(s) = 0 = [1 - G_1(s)G_2(s)G_3(s)] + G_1(s)G_3(s)G(s)H(s)$$  (20)

The closed loop transfer function is $$C(s)/R(s) = \{G_1(s)G(s)\}/\{1 + LG(s)\}$$  (21)

where the loop gain $LG(s)$ is given in Eq.(19). For $$G_1(s)G_2(s)G_3(s) = 1$$

the closed loop transfer function becomes $$C(s)/R(s) = 1/H(s)G_3(s)$$

which reduces to the closed loop transfer function of the embodiment of FIG. 1a, given in Eq.(1), for $G_3(s) = 1$, as expected. In that case, $C(s)/R(s) = 1/H(s)$.

The purpose of the generalization in the embodiment in FIG. 1b is to enable further insight into the effects of the component drifts which cause the variations in the loop gains in the CBBB. This insight is now enhanced by observing the effects due to each of the gain blocks 115, 116 and 117 as their transfer functions $G_1(s)$, $G_2(s)$ and $G_3(s)$, respectively, may in general vary from their ideal values given in the simplest case of $$G_1(s) = G_2(s) = G_3(s) = 1$$

Another purpose of the generalization in the embodiment in FIG. 1b is to perform a generalized synthesis of both stabilizing feedback circuit 120, whose transfer function is $H(s)$, and the stabilizing direct path circuit 119, of transfer function $H_R(s)$, in general case of a controlled system/plant of m-th order taking into account the entry of the disturbance/noise as shown in FIG. 1b. Let $G_1(s) = G_3(s) = 1$, $G_2(s) = a$. It is easily shown that in such a case $$C(s) = \{H_R(s)G_1'(s)G_2'(s)\}R(s)/\{1-a+H_R(s)G_1'(s)G_2'(s)H(s)\} + \{(1-a)G_2'(s)\}D(s)/\{1-a+H_R(s)G_1'(s)G_2'(s)H(s)\}$$  (22)

The loop gain is $$LG(s) = H_R(s)G_1'(s)G_2'(s)H(s) - \alpha \qquad (23)$$

The characteristic equation is $$1 - \alpha + H_R(s)G_1'(s)G_2'(s)H(s) = 0 \qquad (24)$$

For stabilizing feedback and direct path circuits 120 and 119, whose transfer functions are H(s) and $H_R$(s) respectively, implemented as constant gain circuits $$H(s) = h, \quad H_R(s) = h_r$$

i.e., for a proportional control only, it is seen from Eq.(24) that, due to Routh-Hurwitz criterion, the condition for stability is that gain $\alpha < 1$ so that in the limit case $(1-\alpha)$ approaches zero from the positive side, as given earlier in Eq.(16), in connection with the embodiment of FIG. 1a, and repeated here $$(1-\alpha) \to 0^+ \qquad (16)$$

(The stability condition expressed above is actually necessary but not sufficient. Namely, in order for a characteristic equation of a linear time-invariant system of the form $$F(s) = a_0 s^n + a_1 s^{n-1} + a_2 s^{n-2} + \ldots + a_{n-1}s + a_n = 0$$

where all the coefficients are real numbers, to have no roots with positive real parts, it is necessary but not sufficient that
1. All the coefficients of the polynomial have the same sign (the argument used in the preceding discussion), and
2. None of the coefficients vanishes.

These two necessary conditions for stability, however, are not sufficient; it is quite possible that a polynomial with all its coefficients nonzero and of the same sign still has zero in the right half of the s-plane. The necessary and sufficient conditions that all roots of the characteristic equation lie in the left half of the s-plane (condition for stability) in that polynomial's Hurwitz determinants, $D_k$, $k = 1, 2, \ldots, n$, must all be positive. The Hurwitz determinants are $$D_1 = a_1, \quad D_2 = \begin{vmatrix} a_1 & a_3 \\ a_0 & a_2 \end{vmatrix}, \ldots$$

$$\ldots D_n = \begin{vmatrix} a_1 & a_3 & a_5 & \ldots & a_{2n-1} \\ a_0 & a_2 & a_4 & \ldots & a_{2n-2} \\ 0 & a_1 & a_3 & \ldots & a_{2n-3} \\ 0 & a_0 & a_2 & \ldots & a_{2n-4} \\ 0 & 0 & a_1 & \ldots & a_{2n-5} \\ \vdots & & & & \vdots \\ 0 & 0 & 0 & \ldots & a_n \end{vmatrix}$$

where the coefficients with indices larger than n or with negative indices are replaced by zeros).

It can also be shown, similarly as in connection with FIG. 1a (see discussion referring to Eq.(15), that, for the proportional control in FIG. 1b, the denominator polynomials of the partitioned plant in FIG. 1b, i.e., of $G_1'(s)$ and $G_2'(s)$, affect the stability at higher frequencies. Also, for the condition of Eq.(16), in FIG. 1b $$V_c(s) = \{[1/H_R(s)G_1'(s)][1/H(s)G_2'(s)]\}R(s) - \{1/H_R(s)G_1'(s)\}D(s) \qquad (25)$$

$$V_1(s) = \{C(s)/G_2'(s)\} - D(s) = \{1/H(s)G_2'(s)\}R(s) - D(s) \qquad (26)$$

Eqs.(25) and (26) are important for determining the linear region of system operation, i.e., to prevent it from going into saturation, on the basis of parameters of the plant $G_1'(s)$, $G_2'(s)$, control input R(s), and expected limits of the disturbance D(s). Also, it is seen that $H_R(s)$, H(s) respectively control $G_1'(s)$, $G_2'(s)$.

Analyzing further the characteristic equation of the embodiment of FIG. 1b, given as Eq.(24), we notice that the worst case is when the plant transfer functions, $G_1'(s)$ and $G_2'(s)$, are lowpass filter functions (as the control of the embodiment requires instantaneous response of a sluggish plant). Let $$G_1'(s) = K_1 / \left[ 1 + \sum_{i=1}^{n_1} a_i s^i \right],$$

$n_1, n_2$ = Orders of the plant respective partitions (first and second partition), $$G_2'(s) = K_2 / \left[ 1 + \sum_{j=1}^{n_2} b_j s^j \right],$$

$n_1 + n_2 = m$ (plant of m-th order), $K_{1,2}$ constants, in which case the characteristic equation (Eq.(24)) becomes $$[(1-\alpha)/K_1 K_2] \left[ 1 + \sum_{i=1}^{n_1} a_i s^i \right] \left[ 1 + \sum_{j=1}^{n_2} b_j s^j \right] + H_R(s)H(s) = 0 \qquad (27)$$

Similarly as in connection with the embodiment in FIG. 1a, the embodiment of FIG. 1b is made unconditionally stable by maximally minimizing the effects of the drift (variation of $\alpha$) and the effects of the plant denominator polynomials at higher frequencies through synthesizing the stabilizing feedback and direct path circuits 120 and 119, respectively, as derivative controls $$H_R(s) = h_r \prod_{i=1}^{n_1} (1 + sT_i),$$

$h_r$ = Constant, $T_i$ = Differentiation time constant, $$H(s) = h \prod_{j=1}^{n_2} (1 + sT_j),$$

h = Constant, $T_j$ = Differentiation time constant.

The characteristic equation, given in Eq.(27), becomes $$[(1-a)/K_1K_2h_rh]\left[1+\sum_{i=1}^{n_1}a_is^i\right]\left[1+\sum_{j=1}^{n_2}b_js^j\right]+ \quad (28)$$

$$\prod_{i=1}^{n_1}(1+sT_i)\prod_{j=1}^{n_2}(1+sT_j)=0$$

Letting $K_1K_2h_1h_2$ large value, it is seen from Eq.(28) that the effects due to the plant denominator polynomials (characterized with coefficients $a_i$ and $b_j$) are minimized as well as that the stability is maintained for $a<>1$, i.e., as in Eq.(18)

$$(1-a)\to +0 \quad (18)$$

The requirement of letting both $h_r$ and $h$ constants large values may be modified in letting only constant $h_r$ large value because constant $h$ is in a way predetermined by its involvement in forming the desired transfer function of the embodiment of FIG. 1b. Namely, the desired transfer function of the embodiment in FIG. 1b, achieved for $G_1(s)=G_3(s)=1$, $G_2(s)=a\to 1$ as originally shown in Eq.(1) and replaced here $$C(s)/R(s)=1/H(s) \quad (1)$$

(this is verified through inspection of Eq.(22)), predetermines the desired value of gain constant $h$, incorporated in the expression for the transfer function of the stabilizing feedback circuit H(s) as shown previously, so that a degree of freedom can be exercised in choosing only a large value for the other constant $h_r$.

It is, of course, also seen from Eq.(22) that another ideal property of a control system—a complete disturbance/noise rejection, expressed originally in Eq.(2) and replaced here $$C(s)/D(s)=0 \quad (2)$$

is achieved in the embodiment in FIG. 1b for the same conditions ($G_1(s)=G_3(s)=1$, $G_2(s)=a\to 1$). Also, the system function of Eq.(1) can be reduced to a zero-order one by inserting a block of transfer function $mH(s)$ in series between input R(s) and the CBBB as, in such a case, $C(s)/R(s)=m$.

As shown so far, the implementation of stabilizing circuits (both feedback and direct path) reduces to implementing a derivative control. The implementation of the algebraic summers within a CBBB using operational amplifiers is shown in FIG. 5 (other op amp realizations are possible, too). To op amps themselves, being rather physically limited devices, may impose their own limitations into the functioning of the CBBB. Choosing op amp of large gain ($A_o$ in Eq.(3)) and bandwidth of the CBBB to ideal one. An interesting analysis can be performed to show the effects of the op amp nonidealities to the functioning of the CBBB, but is irrelevant for the description of the preferred embodiment of FIG. 1. On the other hand, the implementation of the CBBB can be performed in various other ways including a software/arithmetic implementation of the CBBB structure, including both algebraic summing and stabilizing circuitry. The algebraic summing is simple and any implementation should remain similarly simple. Ultimately, the performance characteristics of a system employing a CBBB are limited only by the physical limitations of a physical system such as the finite energy level of available sources, finite power dissipation capability of available components, and finite speed of transition of control signals.

In FIG. 5a, an input command voltage $V_r(s)$, applied at terminal 501, is fed to a CBBB, numbered 513. The CBBB incorporates two op amps, 504 and 510, each of open loop gain A(s) (given earlier in Eq.(3)). Associated with op amp 504 are resistors 502, 503, 505, and 506, each of resistors R. Associated with op amp 510 are resistors 508, 509, 511, and 512, each of resistance R. The op amps with the associated resistors are connected to provide for the required algebraic summing as shown by summers 102 and 109 in FIG. 1a. A control voltage signal $V_c(s)$, available at point 507, is produced as an output of CBBB. A negative voltage feedback signal $V_f$, available on lead 517, is also processed within CBBB. The CBBB controls plant 514 of transfer function G(s). An output controlled voltage $V_o(s)$, available at terminal 515, is fed to a stabilizing feedback circuit 516 of transfer function H(s) which provides at its output 517 the negative voltage feedback signal being processed within the CBBB. Inside of the CBBB, a positive voltage feedback loop of unity loop gain is effectively closed through the connection of the op amps and resistors. For the purposes of calculating the loop gain of the system of FIG. 5a, two possible breaks of the loop are shown as X-X' and $X_1$-$X_1'$ with the corresponding voltage signals of relevance $V_c(s)$, $V_{out}(s)$ and $V_c'(s)$, $V_{out}'(s)$, respectively. It will be shown that breaking the loop at either break results in the same loop gain as shown in Eq.(8) for the embodiment of FIG. 1a, which is expected.

In FIG. 5b, an input voltage $V_r(s)$, applied at terminal 521, is fed to a CBBB, numbered 529. The CBBB incorporates two op amps, 522 and 526, each of open loop gain A(s). Resistors 528 and 523 of resistances R are associated with op amp 522, while resistors 525 and 527 of the same resistances (R) are associated with op amp 526. Again, the op amp with the associated resistors are connected to provide for an algebraic summing functionally identical to the summing shown in the CBBB in FIG. 1. It is readily seen by inspecting the circuit diagram within the CBBB (box 529) of FIG. 5b that a factor of 2 is present in the path of the negative voltage feedback signal $V_f(s)$, fed by means of lead 533 in the CBBB, but this factor does not change the basic functioning of the embodiment of FIG. 1 at all. For example, placing H(s)/2 instead of H(s) for a stabilizing feedback circuit transfer function (block 532 in FIG. 5b) makes the effects of the factor of 2 nonexistent. A control voltage signal $V_c(s)$, available at point 524, is produced as an output of CBBB. The negative voltage feedback signal $V_f(s)$, available on lead 533, is processed in the CBBB. The CBBB controls plant 530 of transfer function G(s). An output controlled voltage $V_o(s)$, available at terminal 531, is fed to the stabilizing feedback circuit 532 or transfer function H(s) which provides at its output 533 the negative voltage feedback signal $V_f(s)$ being processed in the CBBB. Inside of the CBBB, a positive voltage feedback loop of unity loop gain is effectively closed through the connection of op amps and resistors. For the purposes of calculating the loop gain of the system of FIG. 5b, two possible breaks of the loop are shown as X-X' and $X_1$-$X_1'$ with the corresponding voltage signals of relevance $V_c(s)$, $V_{out}(s)$ and $V_c'(s)$, $V_{out}'(s)$, respectively. Again, it will be shown that breaking the loop at either break results in essentially the same loop gain as shown in Eq.(8) for the embodiment of FIG. 1a, which is expected.

Before calculating the loop gain for the system in FIG. 5, a well known relation to be used repetitively in the course of the calculation of the loop gain in FIG. 5, is recalled first. For an op amp having a negative feedback resistor R and a resistor R connected to the inverting input terminal it is easily found that $$V_o = [2V_2 - V_1]/[1+(2/A(s))] \quad (29)$$

where $V_o$ is the output voltage of the op amp, $V_2$ is the voltage applied to the noninverting input terminal, $V_1$ is the voltage applied to the other end of the resistor connected to the inverting input terminal, and $A(s)$ is the open loop gain of the op amp previously given in Eq.(3).

For each of the breaks in the loop in FIG. 5 it is assumed that the sending voltage ($V_c(s)$ or $V_c'(s)$) sees a high impedance so that the receiving voltage ($V_{out}(s)$ or $V_{out}'(s)$) is practically unchanged with respect to the value before breaking the loop (as the same high impedance is terminating the loop according to the definition of the procedure of finding loop gain). The high impedance assumption is easily ensured by appropriate buffering.

For break X-X' of FIG. 5a, and using Eq.(29), $$V_{out}(s) = V_c(s)\{[(\tfrac{1}{2})(2)(\tfrac{1}{2})(2)]/[1+(2/A(s))]^2 + G(s)H(s)[(-1)(\tfrac{1}{2})(2)]/[1+(2/A(s))]^2\}$$

which is easily reduced to $$V_{out}(s) = V_c(s)[1+(2/A(s))]^2[1-G(s)H(s)] \quad (30)$$

From Eqs.(4) and (30) and for $A(s) \to \infty$ the loop gain is identical to the loop gain given earlier in Eq.(8) and repeated here $$LG(s) = G(s)H(s) - 1 \quad (8)$$

as expected.

Similarly, for break $X_1$-$X_1'$ in FIG. 5a, and using Eq.(29), $$V_{out}'(s) = V_c'(s)\{[(\tfrac{1}{2})(2)]^2/[1+(2/A(s))]^2 + [(\tfrac{1}{2})(2)/[1+(2/A(s))]^2][-G(s)H(s)]\}$$

which is easily reduced to $$V_{out}'(s) = V_c'(s)[1/[1+(2/A(s))]^2][1-G(s)H(s)]$$

the expression functionally identical to the expression in Eq.(30) so that, using Eq.(4) applied to the break $X_1$-$X_1'$ in FIG. 5a, and for $A(s) \to \infty$ the loop gain is again identical to the loop gain given earlier in Eq.(8) and repeated here $$LG(s) = G(s)H(s) - 1 \quad (8)$$

For break X-X' in FIG. 5b, and using Eq.(29), $$V_{out}(s) = V_c(s)\{[(-1)/[1+(-2/A(s))]]^2 + G(s)H(s)[(-2)/[1+(2/A(s))]^2]\}$$

which is rewritten as $$V_{out}(s) = V_c(s)[1/[1+(2/A(s))]^2][1-2G(s)H(s)] \quad (31)$$

From Eqs.(4) and (31) and for $A(s) \to \infty$ $$LG(s) = 2G(s)H(s) - 1 \quad (32)$$

Eq.(32) is essentially identical to Eq.(8), as discussed previously and as expected.

For break $X_1$-$X_1'$ in FIG. 5b, and using Eq.(29), $$V_{out}'(s) = V_c'(s)\{[(-1)/[1+(2/A(s))]]^2 + G(s)H(s)[(-2)/[1+(2/A(s))]^2]\}$$

which is rewritten as $$V_{out}'(s) = V_c'(s)[1/[1+(2/A(s))]^2][1-2G(s)H(s)]$$

the expression functionally identical to the expression in Eq.(31) so that, using Eq.(4) applied to the break $X_1$-$X_1'$ in FIG. 5b, and for $A(s) \to \infty$ the loop gain is identical to the loop gain given in Eq.(32) and thus essentially identical to Eq.(8), as expected.

Another insight provided by Eq.(8), and confirmed in Eq.(32), is that indeed the loop gain of the system incorporating a CBBB is result of effects both due to the negative feedback loop ($G(s)H(s)$) and due to the positive feedback loop of unity loop gain ($-1$ as per definition in Eq.(4)), these effects being present and acting simultaneously and inseparably. That is why, once more, the loop gain of a system incorporating CBBB provides full insight for analysis only if found in the way indispensable from the simultaneousness and inseparability of the two loops. That way has been proposed, emphasized and used in analyzing the embodiments of the invention.

Figure 6A:
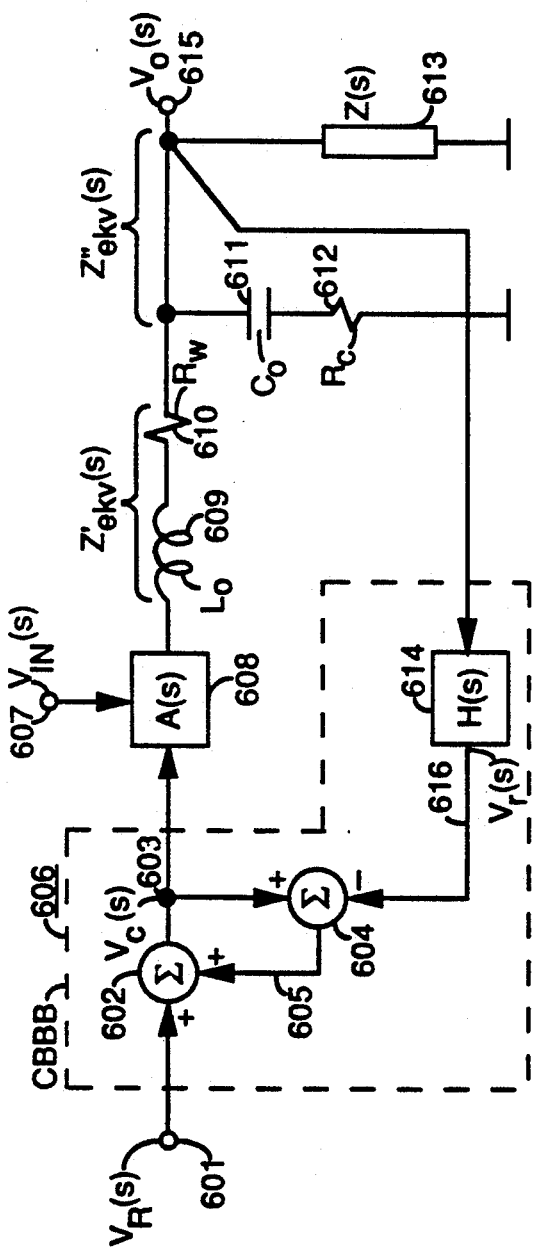
FIGS. 6a and 6b are block and circuit diagrams of an application of the presently preferred embodiment of the invention to achieving ideal control of a switch mode power converter.
Figure 6B:
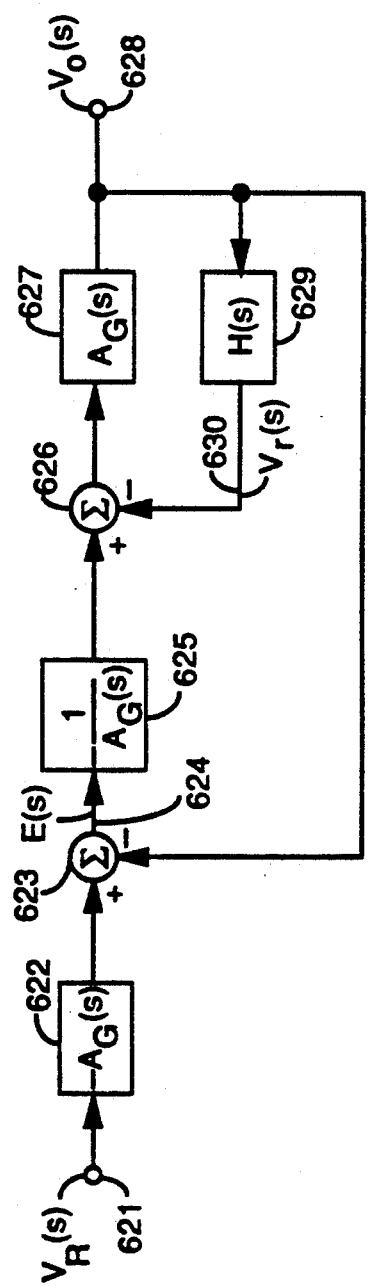

FIG. 6 illustrates an application of CBBB, numbered 606, to the switch mode power converter with a second order lowpass filter at the output. The CBBB provides for complete independence to the input voltage (line) $V_{IN}(s)$ variations as well as to the variations of a complex load $Z(s)$. Both Nyquist and Routh-Hurwitz criterion of stability for the case of the system of FIG. 6 will be applied to show the unconditional stability of the system while still providing the ideal control system properties of load independence and input voltage variation independence. The two criteria, Nyquist and Routh-Hurwitz, are usually recommended for the stability analysis of the multiloop systems which is the system in FIG. 6. Prior to going in this type of analysis, however, the system in FIG. 6 is due to be described. In FIG. 6a, a reference voltage $V_g(s)$ is applied at terminal 601 as one of the two inputs of the CBBB. Also processed within the CBBB is the feedback signal $V_f(s)$, available on lead 616. The CBBB incorporation algebraic summers 602 and 604 which provide for closing a unity gain positive voltage feedback loop and a negative voltage feedback loop, both loops closed through lead 605. A control voltage signal $V_c(s)$ is provided at point 603 as an output from the CBBB. The signal $V_c(s)$ controls a pulse width modulated power converter 608 whose transfer function is $A(s)$ and which receives power from a source of voltage $V_{IN}(s)$, output of the pulse width modulated stage 608 and a complex load impedance 613 of value $Z(s)$. The filter consists of an inductor of inductance $L_o$, numbered 609, and wire resistance $R_w$, numbered 610, and a capacitor of capacitance $C_o$, numbered 611, and equivalent series resistance $R_c$, numbered 612. The inductor impedance is $Z_{ekv}'(s) = R_w + sL_o$, and impedance $Z_{ekv}''(s) = [R_c + (1/sC_o)] || Z(s)$. An output controlled variable is here a dc output voltage $V_o(s)$, available at terminal 615. The negative voltage feedback is closed through a stabilizing feedback circuit 614 of transfer function H(s). FIG. 6b is equivalent to FIG. 6a. In FIG. 6b, the reference voltage $V_R(s)$, available at terminal 621, is applied via block 622, of transfer function $-A_G(s)$, to an algebraic summer 623. The algebraic summer 623 produces at its output 624 a signal E(s) as a result of algebraic summing of the output voltage $V_o(s)$ and voltage available at the output of block 622. Signal E(s) is passed through block 625 of transfer function $-1/A_G(s)$. An algebraic summer 626 enables summing of the negative voltage feedback signal $V_f(s)$, available on lead 630, and a signal produced at the output of block 625. The output of the summer 626 is passed through a block 627 of transfer function $A_G(s)$ whose output provides the dc output voltage $V_o(s)$, available at terminal 628. The two feedback loops are closed from the output dc voltage $V_o(s)$: one loop through summer 623 and another through the stabilizing feedback circuit 629 of transfer function H(s) and the summer 626.

For the equivalency of FIGS. 6a and b, a function $A_G(s)$ is established as $$A_G(s) = A(s)[Z_{ekv}''(s)/[Z_{ekv}'(s) + Z_{ekv}''(s)]] \quad (33)$$

A transfer function of the pulse width modulation stage 607 in FIG. 6a may in general be written as a single pole function similar to the one in Eq.(3)

$$A(s) = A_o/(1 + s\tau_a) \quad (34)$$

Nyquist criterion is applied to the closed loop part of the system of FIG. 6b, i.e., to the part of the system between the output of the block 622 and the dc output voltage at terminal 628. Applying the criterion results in a special case as generality of transfer function H(s), of block 629, is encountered so that no specific Nyquist plot can be plotted; instead, a characteristic equation of the overall closed loop part in FIG. 6b is found as $$1 + F(s) = 0 \quad (35)$$

where $$F(s) = V_o(s)/E(s) \quad (36)$$

Eq.(36) also represents a loop gain of the system of FIG. 6b because of the unity gain of the outer loop in the figure. From FIG. 6b $$F(s) = LG(s) = [-1/A_G(s)][A_G(s)/[-1 + A_G(s)H(s)]] = -1/[1 + A_G(s)H(s)] \quad (37)$$

Eq.(33), with reference to FIG. 6a and substituting Eq.(34), is rewritten as $$A_G(s) = [A_o/(1 + s\tau_a)][K(s + 1/T_z)]/[(s + 1/T_{p1})(s + 1/T_{p2})] \quad (38)$$

where K is a constant, $T_z$, $T_{p1}$, and $T_{p2}$ are time constants, all determined from $$G_o(s) = Z''_{ekv}(s)/[Z'_{ekv}(s) + Z''_{ekv}(s)] =$$

$$K_1(s + 1/T_z)/[a_o s^2 + a_1 s + a_2] = \frac{[K(s + 1/T_z)]}{[(s + 1/T_{p1})(s + 1/T_{p2})]}$$

where $K_1 = T_z = C_o R_c$,
$a_o = L_o C_o[1 + R_c/R_L]$,
$a_1 = C_o[R_c + R_w + R_c R_w/R_L]$,
$a_2 = 1 + R_w/R_L$,
$Z(s) = R_L$.

Substituting Eq.(38) into Eq.(37)

$$F(s) = LG(s) = -[(s + 1/\tau_a)(s + 1/T_{p1})(s + 1/T_{p2})]/\{[(s + 1/\tau_a)(s + 1/T_{p1})(s + 1/T_{p2})] + KA_o H(s)(s + 1/T_z)\} \quad (39)$$

If it was possible, the Nyquist plot should have been made on the basis of the loop gain expressed in Eq.(39). However, the denominator in Eq.(39) is not in a factored form, necessary condition to proceed to plot the Nyquist plot, so that the stability condition is obtained from the characteristic equation instead. Substituting Eq.(39) into Eq.(35)

$$KA_o H(s)(s + 1/T_z) = 0 \quad (40)$$

where $$T_z = C_o R_c > 0 \quad (41)$$

as found earlier.

From Eqs.(40) and (41) it is seen that the characteristic root (pole) is in the Left-Half Plane (LHP) of the s-plane, for any $H(s) > 0$, implying unconditional stability. The characteristic root is a negative real number implying a transient response, upon a disturbance, of a form $\exp(-t/C_o R_c)$ which decays very fast for capacitors of small equivalent series resistance $R_c$.

Similarly, applying Routh-Hurwitz method, a characteristic equation for the system in FIG. 6a is first found as $$aC_o R_c A_o H(s) R_L + A_o H(s) R_L = 0 \quad (42)$$

Eq.(42) yields construction of the Routh table

| $s^1$ | $A_o H(s) R_L C_o R_c > 0$, | $H(s) > 0$ |
|---|---|---|
| $s^0$ | $A_o H(s) R_L > 0$, | $H(s) > 0$ | implying unconditional stability identically as in Nyquist analysis. Of course, it can also be directly seen from Eq.(42) that the same characteristic root is obtained through the Routh-Hurwitz analysis as through the Nyquist analysis; the characteristic root is, again, at $s_{pole} = -1/C_o R_c$, implying the stability of the system in FIG. 6. At the same time, the system in FIG. 6 has ideal control system characteristics as discussed earlier: independence from variations of input voltage $V_{IN}$ and load Z(s). This is easily seen from FIG. 6a from which $$V_o(s)/V_R(s) = 1/H(s)$$

independent of load and input voltage variations.

The switch mode power converter in FIG. 6 illustrates only one of all possible applications of the preferred embodiment of the present invention shown in FIG. 1. Again, and as said in the summary of the invention, the preferred embodiment of FIG. 1 can be applied as a basic building block in any control system application including electric and nonelectric motor drive systems, control of physical processes, robot control, etc. In providing the ideal control system properties for the system under the control, i.e., zero error in both transient and steady state in response to both command and disturbance, the preferred embodiment provides additionally an inherent adaptive/self-tuning control in that it does not require the knowledge of the parameters of the system under the control. The theoretical zero error (in transient) is, of course, limited by the physical limitations of any physical system, as discussed in the detailed description previously. Thus, the preferred embodiment of the present invention represents an ultimate control method. The significance of this control method is also in that it is quite feasible and inexpensive to implement and thus of high potential of being incorporated in any system. Various changes and modifications may be made, and features described in connection with the preferred embodiment may be used with any others within the scope of the inventive concept. For example, in general one or more positive feedback loops may be closed within one or more negative feedback loops within the scope of the inventive concept to provide for desired (ideal) properties of a control system.

We claim:

1. A method for ideally controlling a system comprising:
controlling a system,
supplying an input command signal for controlling an output controlled variable of said system,
using a control basic building block for the system control,
supplying a control voltage signal produced by said control basic building block for the control of said system,
providing simultaneously an infinite gain of said control basic building block and a stable operation of a negative voltage feedback loop closed through said control basic building block, whereby an ideal control, resulting in a zero error in both transient and steady state with respect to said input command signal and a disturbance to said system and in an adaptive and self tuning manner, and simultaneous stable control system is being achieved.

2. The method of claim 1 wherein said control basic building block, supplying said control voltage signal and consisting of an inner positive voltage feedback loop of unity loop gain within said negative voltage feedback loop incorporating a stabilizing feedback circuit, is of said interior infinite gain and wherein said negative voltage feedback loop closed through said stabilizing feedback circuit and via the unity loop gain positive voltage feedback loop of said infinite gain is of said stable operation.

3. The method of claim 2 wherein said negative voltage feedback loop closed through said control basic building block is of a loop gain of a value $$LG(s) = G(s)H(s) - 1$$

in the loop gain G(s) being a transfer function of the controlled system, and H(s) being a transfer function of said stabilizing feedback circuit.

4. The method of claim 3 wherein said control basic building block is physically implemented as a circuit for algebraic summing and loop stabilizing enabling closing of said inner positive voltage feedback loop of unity loop gain and said negative voltage feedback loop through said stabilizing feedback circuit.

5. The method of claim 4 wherein said inner positive voltage feedback loop of unity loop gain is physically implemented by feeding back said control voltage signal in a positive feedback manner and through a unity gain loop and wherein said negative voltage feedback loop is physically implemented by feeding back said output controlled variable of said system through said stabilizing feedback circuit.

6. The method of claim 5 wherein said stabilizing feedback circuit is physically implemented as a derivative circuit performing derivative control according to a transfer function of said stabilizing feedback circuit $$H(s) = 1 + \sum_{i=1}^{k} h_i s^i$$

in the transfer function of said stabilizing feedback circuit $h_i$ being a constant, k being an order of said stabilizing feedback circuit, and s being a laplace complex frequency variable.

7. The method of claim 6 wherein said order of said stabilizing feedback circuit is of value $$k = m - n$$

in the value m being order of a denominator polynomial of a transfer function of the controlled system, and n being order of a numerator polynomial of transfer function of the controlled system.

8. A method for ideally controlling a system comprising:
controlling a system,
supplying an input command signal for controlling an output controlled variable of said system,
using a control basic building block for the system control,
supplying a control voltage signal produced by said control basic building block for the control of said system,
providing simultaneously an infinite gain of said control basic building block and a stable operation of a negative voltage feedback loop closed through said control basic building block, whereby an ideal control, resulting in a zero error in both transient and steady state with respect to said input command signal and a disturbance topologically entering said system anywhere between two partitions of said system and in an adaptive and self tuning manner, and simultaneous stable control system is being achieved.

9. The method of claim 8 wherein said control basic building block, supplying said control voltage signal and consisting of an inner positive voltage feedback loop of unity loop gain within said negative voltage feedback loop incorporating a stabilizing feedback circuit and a stabilizing direct path circuit, is of said infinite gain and wherein said negative voltage feedback loop closed through said stabilizing feedback circuit and said stabilizing direct path circuit and via the unity loop gain positive voltage feedback loop of said infinite gain is of said stable operation.

10. The method of claim 9 wherein said negative voltage feedback loop closed through said control basic building block is of a loop gain of a value $$LG(s) = H_R(s)G_1'(s)G_2'(s)H(s) - 1$$

in the loop gain $H_R(s)$ being a transfer function of said stabilizing direct path circuit, $G_1'(s)$ being a transfer function of a first of the two partitions of said system, $G_2'(s)$ being a transfer function of a second of the two partitions of said system, and H(s) being a transfer function of said stabilizing feedback circuit.

11. The method of claim 10 wherein said control basic building block is physically implemented as a circuit for algebraic summing and loop stabilizing enabling closing of said inner positive voltage feedback loop of unity loop gain and said negative voltage feedback loop through said stabilizing feedback circuit and said stabilizing direct path circuit.

12. The method of claim 11 wherein said inner positive voltage feedback loop of unity loop gain is physically implemented by feeding back a control signal, obtained at input of said stabilizing direct path circuit, in a positive feedback manner and through a unity gain loop and wherein said negative voltage feedback loop is physically implemented by feeding back said output controlled variable of said system through said stabilizing feedback circuit and by delivering said control signal to said input of said stabilizing direct path circuit.

13. The method of claim 12 wherein said stabilizing feedback circuit is physically implemented as a derivative circuit performing derivative control according to a transfer function of said stabilizing feedback circuit $$H(s) = h \prod_{j=1}^{n_2} (1 + sT_j)$$

in the transfer function of said stabilizing feedback circuit h being a constant, $n_2$ being an order equal to order of said second of the two partitions of said system, $T_j$ being a differentiation time constant of said derivative circuit performing derivative control, and s being a laplace complex frequency variable.

14. The method of claim 12 wherein said stabilizing direct path circuit is physically implemented as a derivative circuit performing derivative control according to a transfer function of said stabilizing direct path circuit $$H_R(s) = h_r \prod_{i=1}^{n_1} (1 + sT_i)$$

in the transfer function of said stabilizing direct path circuit $h_r$ being a constant, $n_1$ being an order equal to order to said first of the two partitions of said system, $T_i$ being a differentiation time constant of said derivative circuit performing derivative control, and s being a laplace complex frequency variable.

* * * * *